April 2, 1963 E. LEISS ET AL 3,083,601
APPARATUS FOR SLITTING ROLLS OF CLOTH AND METHOD THEREFOR
Filed Feb. 25, 1958 9 Sheets-Sheet 1

INVENTORS
EMIL LEISS
CARL BAYER
LEONARD KRAUTHEIM
BY Munn, Liddy, Daniels & March
ATTORNEYS INVENTORS
EMIL LEISS
CARL BAYER
LEONARD KRAUTHEIM
BY Munn, Liddy, Daniels & March
ATTORNEYS

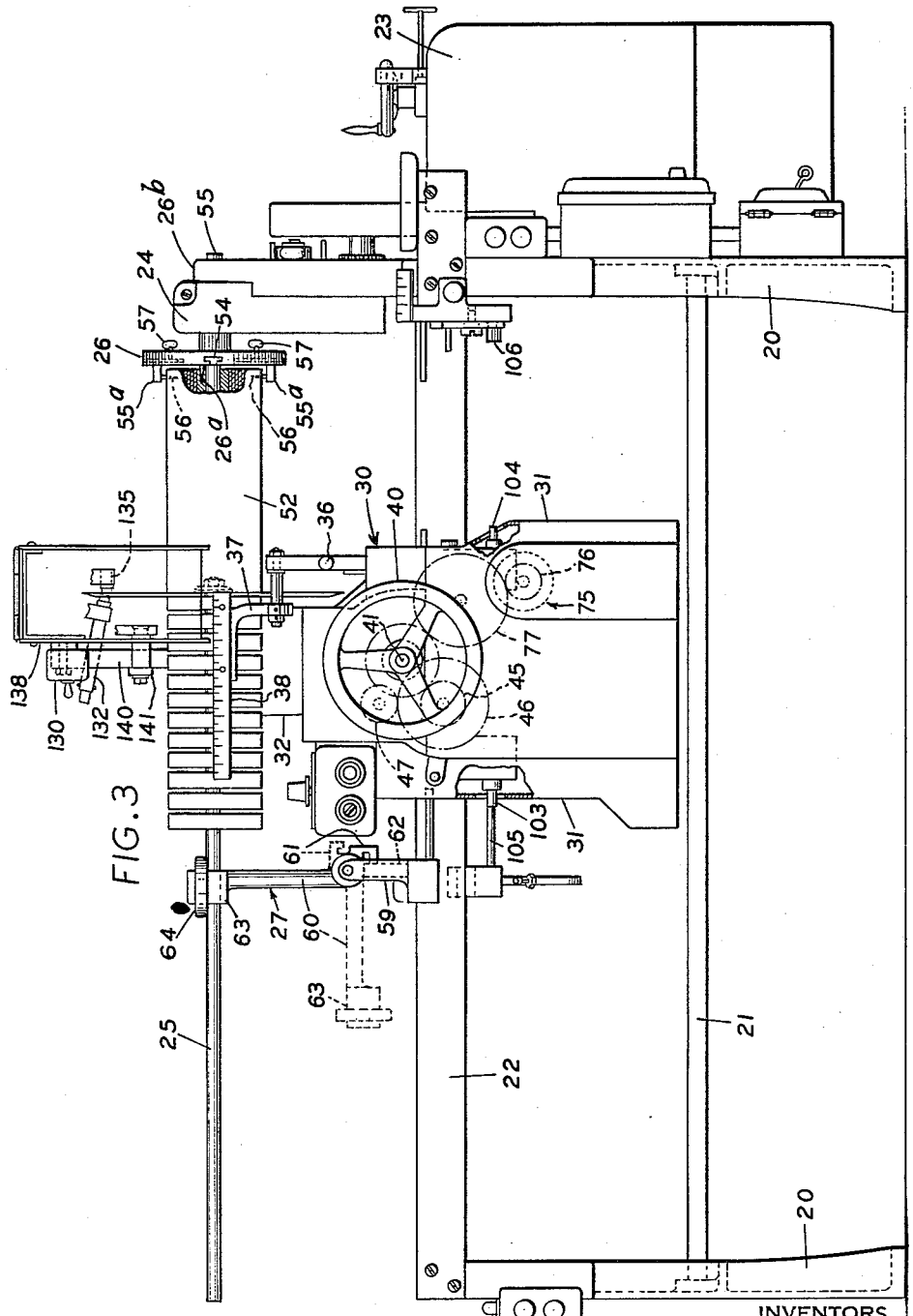

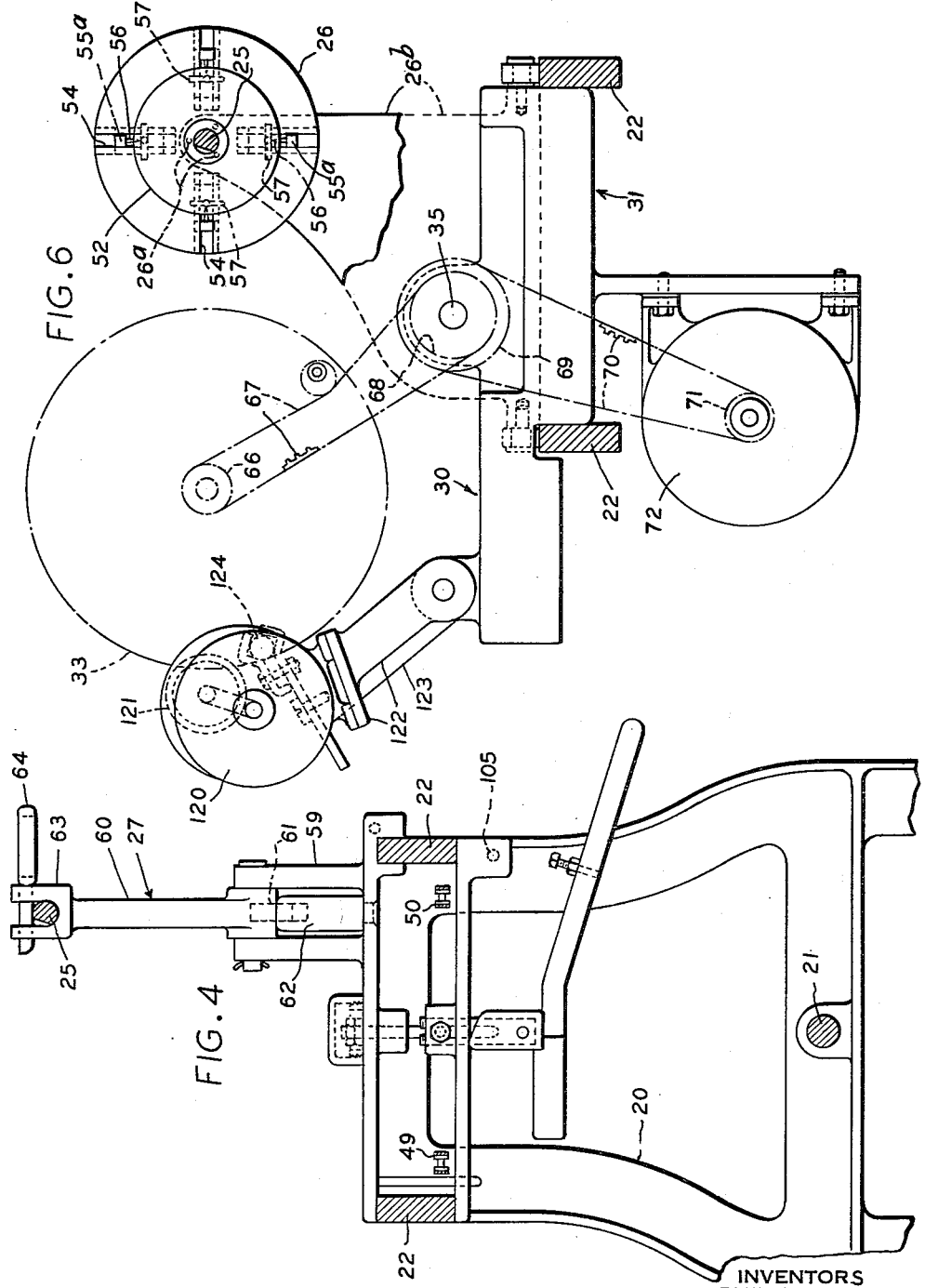

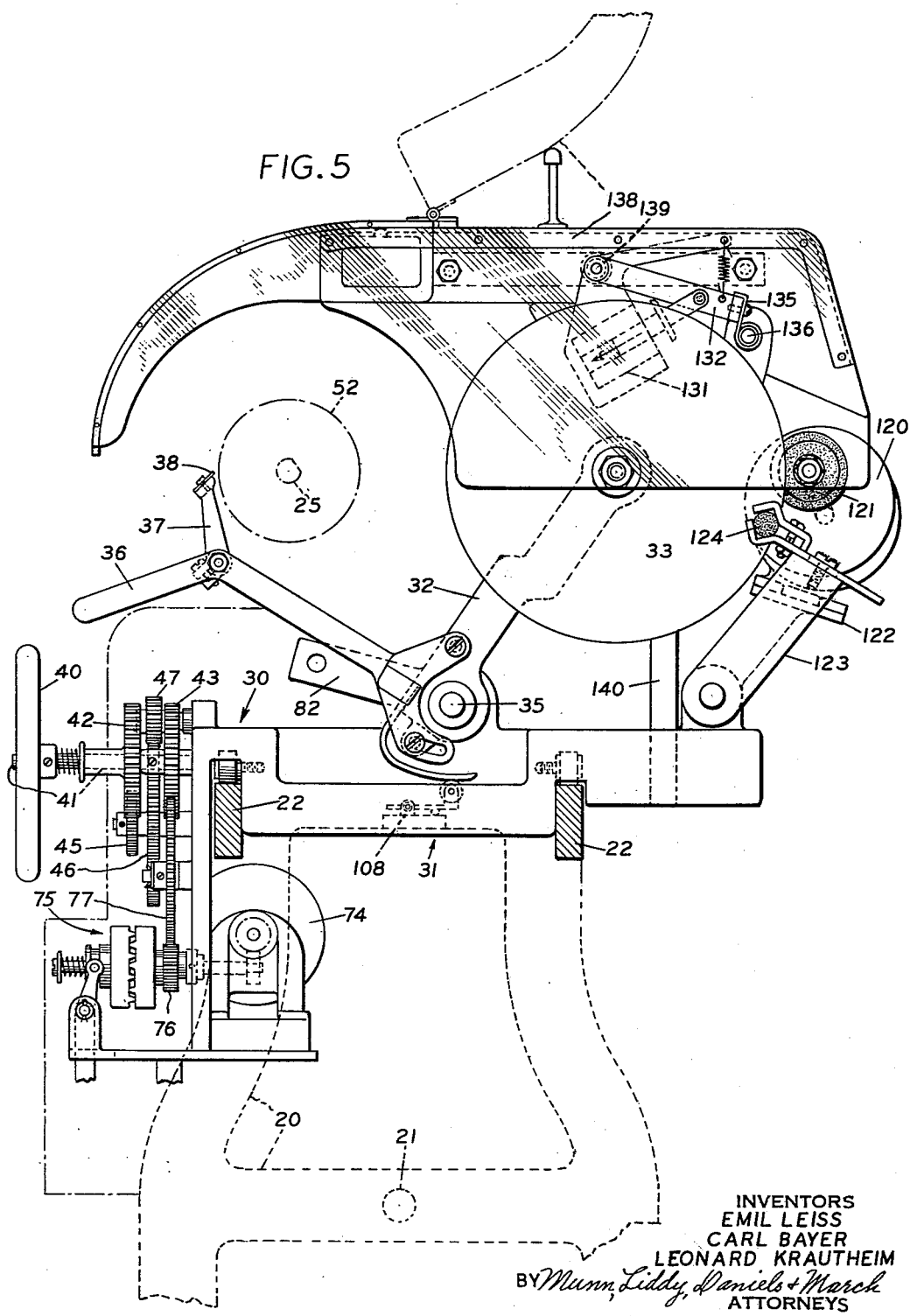

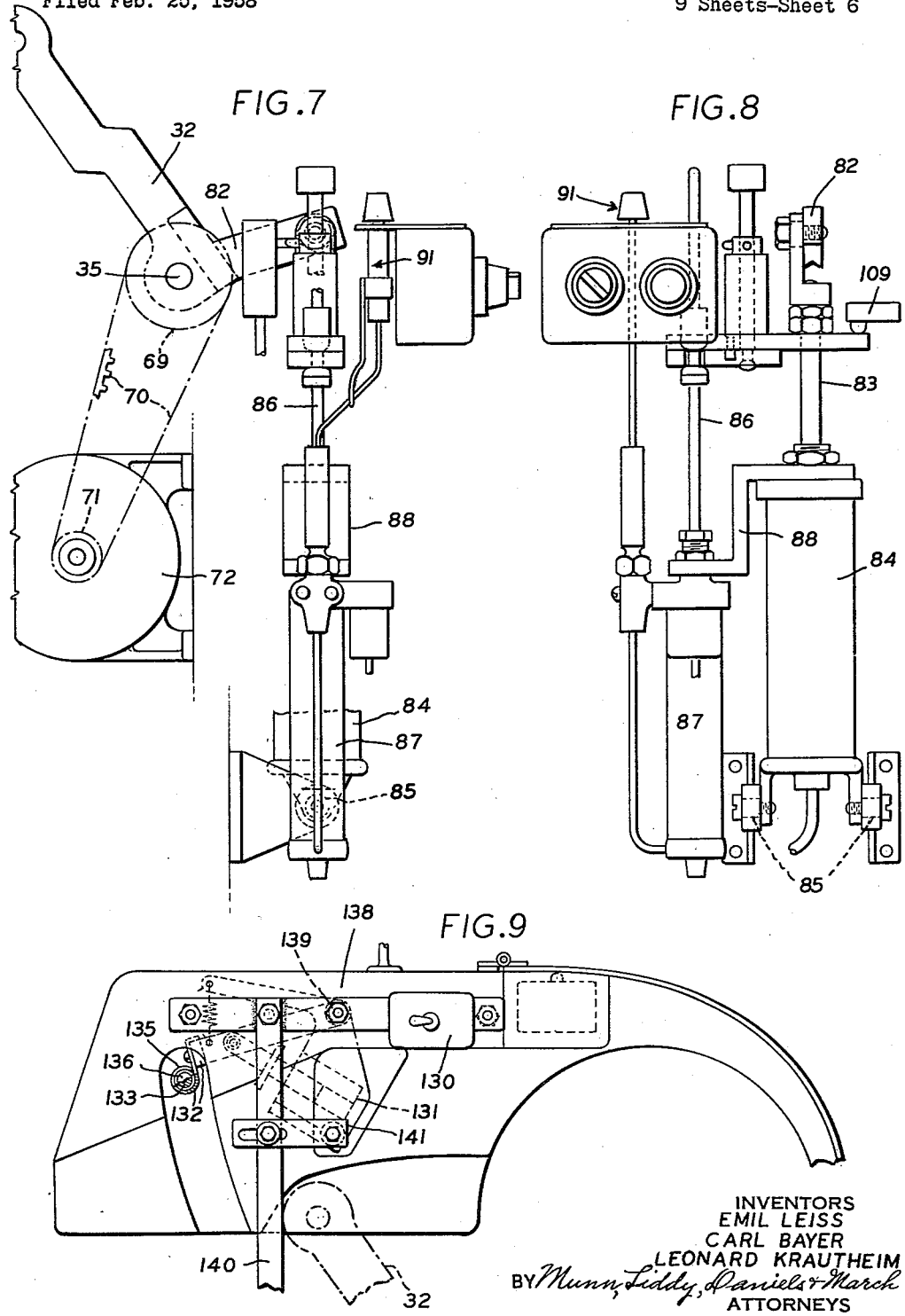

April 2, 1963 E. LEISS ET AL 3,083,601
APPARATUS FOR SLITTING ROLLS OF CLOTH AND METHOD THEREFOR
Filed Feb. 25, 1958 9 Sheets-Sheet 7

INVENTORS
EMIL LEISS
CARL BAYER
LEONARD KRAUTHEIM
BY Munn, Liddy, Daniels & March
ATTORNEYS April 2, 1963 E. LEISS ET AL 3,083,601
APPARATUS FOR SLITTING ROLLS OF CLOTH AND METHOD THEREFOR
Filed Feb. 25, 1958 9 Sheets-Sheet 9

INVENTORS
EMIL LEISS
CARL BAYER
BY LEONARD KRAUTHEIM
ARTHUR A. MARCH &
JAMES E. CURTISS
ATTORNEYS.

United States Patent Office 3,083,601
Patented Apr. 2, 1963

3,083,601
APPARATUS FOR SLITTING ROLLS OF CLOTH
AND METHOD THEREFOR
Emil Leiss, Ridgewood, Carl Bayer, Paramus, and Leonard Krautheim, Haledon, N.J., assignors to Lever Bias Machine Corporation, New York, N.Y., a corporation of New York
Filed Feb. 25, 1958, Ser. No. 717,528
13 Claims. (Cl. 82—48)

This invention relates to means and methods for slitting wide webs or sheets of fabric and the like, and more particularly to the slitting or parting-off of narrow spools of fabric from a wide roll of such material.

The present improved apparatus and method are shown in connection with the slitting of material to produce bias bindings. However, it should be understood that the apparatus and method are not limited to any specific type of cloth or sheet material but instead have utility generally wherever fabric or like sheets or webs in roll form are to be parted or slitted so as to produce from the roll a plurality of relatively narrow spools of the material.

Heretofore, various means and methods have been devised to slit long webs or sheets of cloth into narrow strips. An early patent disclosed rolling up the cloth into a relatively wide roll and then placing such roll in a single-knife type slitting machine which rotated the roll and also rotated a circular knife, enabling the knife to be brought against the roll to part off narrow spools of predetermined width. In this prior machine the roll of cloth was shifted axially after each cut, while the knife did not shift axially, thereby to position the knife for subsequent cuts according to a predetermined spacing. Another machine for slitting cloth also involved applying a rotating knife to a rotating roll. In distinction to the first mentioned machine, however, the knife was shifted axially after each cut to effect the spacing. In both these machines, the axial shifting of the roll or knife was carried out manually, as well as the advance of the knife on the roll to perform the cutting operation.

It has also been proposed in the past to employ an automatic spacing means for shifting one of the rotating components axially, using a Geneva-type movement. Such construction requires great accuracy of a number of machined parts, and further required appreciable upkeep and maintenance. The complicated and critical mechanical parts that were involved resulted in an appreciable cost factor, which was therefore a significant drawback.

Another automatic machine has been constructed, using a lathe principle to advance the rotating roll axially a predetermined distance after each cut so as to effect an automatic spacing for the various cuts. This machine also required somewhat complicated, high-precision parts, and was very expensive to make and to maintain.

The above disadvantages and drawbacks of prior automatic slitting machines of the above type are obviated by our present invention, which provides a novel machine of the type wherein a travelling carriage mounts the knife and effects both edgewise and lateral movement thereof to slit the cloth roll progressively at different places so as to form the desired spools.

One object of the invention is to provide an advantageous and improved machine and method for slitting and parting off narrow spools of material from a wide roll of the same, which machine after once being started is completely automatic in carrying out the consecutive cuts to completely part or divide the roll into the desired number of narrow spools.

A further object of the invention is to provide an improved automatic slitting machine in accordance with the above, which is devoid of expensive, critical machine parts but is instead of relatively simple and inexpensive construction.

Another object of the invention is to provide an improved roll-slitting machine of the above type, which is wholly reliable and effective in its operation, accurately determining the desired spool widths and carrying through completely the individual slitting operations without difficulty or downtime.

A feature of the invention resides in the provision of automatic knife conditioning means whereby the knife blade is always maintained sharp and suitably lubricated in order to insure that clean and complete cuts are made in the roll of material at all times.

Yet another object of the invention is to provide an improved apparatus for slitting rolls of cloth, which is readily, fully adjustable as to its various functions, thereby imparting a desirable flexibility to the machine for handling various materials and effecting different cuts as might be desired.

Another feature of the invention resides in the provision of an improved machine of the above type, which may be quickly adapted for either manual or automatic operation, at the will of the operator.

A further feature of the invention resides in the provision of improved roll-supporting and driving means in a machine of the above character, by which the work is easily set in place and removed, and is effectively driven or rotated in a positive manner.

Another feature of the invention resides in the provision of an improved means and method for cutting the roll and controlling the advance of the rotating knife, whereby a steady and accurate feed of the latter is effected during most of the working stroke, together with a predetermined dwell at the end of such stroke, said feed being reliable at all times and reducing the likelihood of breakage of the knife with resultant danger to personnel operating the machine.

An additional feature of the invention resides in the provision of an improved slitting machine of the type having a knife-carrying, motor driven carriage, wherein the same motor is utilized to effect both a stepped advance of the carriage and also the final return thereof to its initial starting position.

Other features and advantages will hereinafter appear.

In the drawings accompanying this specification, similar characters of reference indicate corresponding parts wherever possible in the several views, in which:

FIG. 3 is a fragmentary front elevational view of the machine.

FIG. 4 is a view mostly in elevation, taken at the left end of the machine on a section line through the machine bed and through the lower tie rod just inside of the left end support.

FIG. 5 is a fragmentary view partly in elevation and partly in section, the section being through the machine from front to back at a point to the right of the carriage.

FIG. 6 is a fragmentary view mostly in elevation, showing the knife blade drive means and the cloth roll and spindle therefor, as viewed from the left of the machine.

FIG. 7 is a section somewhat similar to FIG. 6 but omitting the spindle and cloth roll, and additionally showing the pneumatic and hydraulic drive and control for the knife.

FIG. 8 is a front elevational view of the pneumatic and hydraulic control shown in FIG. 7.

FIG. 9 is a fragmentary elevational view of the upper portion of the knife carriage, taken from the left side thereof.

Fundamentally the improved slitting machine of our invention combines mechanical, electrical, pneumatic and hydraulic controls and components in a novel and unique manner, to effect an automatic slitting of a roll of cloth whereby a number of spools of slit material are automatically produced from the roll after the machine has been set into operation. As mentioned above, the machine is adaptable for either automatic or manual operation, and is so constructed that the end portions of the roll may be slit by manual operation, respectively before and after the remainder of the roll has been automatically slit.

Our machine further embraces a movable, compound, knife carriage wherein the knife is automatically advanced on and retracted from the cloth roll and is automatically laterally or axially shifted to effect the succeeding cuts, and in conjunction with such structure means are provided for effecting a powered return of the said compound carriage to its starting position, and for automatically halting the carriage in said position.

In conjunction with said machine the invention provides a novel method of controlling and advancing the cutting knife to obtain effective cutting of the cloth roll and also the core carrying the same, as will be more fully brought out later.

Figure 1:
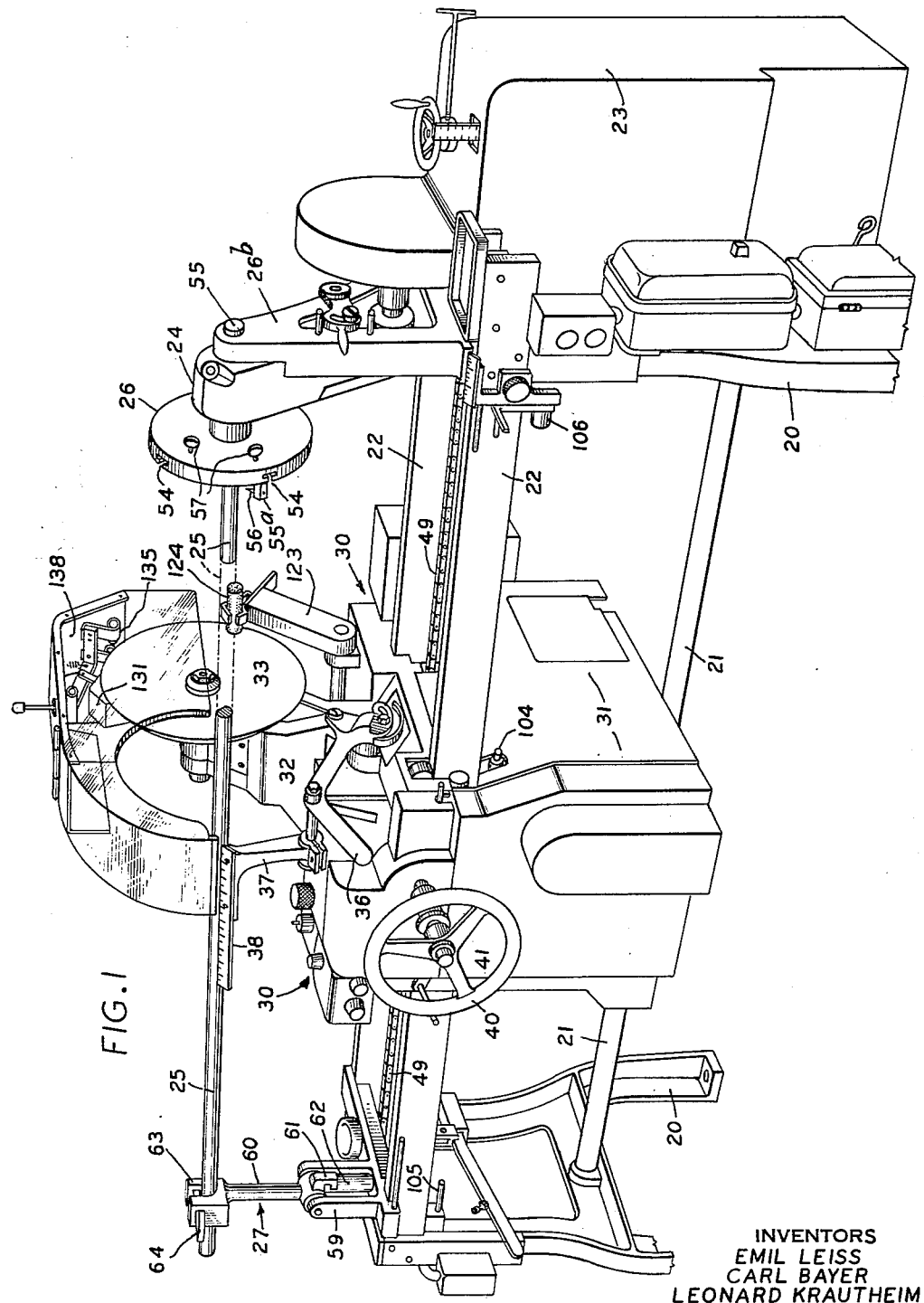
FIGURE 1 is a perspective view of an improved apparatus made in accordance with our invention.

Referring now to FIG. 1, the present improved machine comprises a floor-supported frame having end brackets or members 20 secured in spaced relation by a tie rod 21 and a pair of spaced slide or bed members 22. At its right end the machine is provided with powered drive means enclosed in housings 23 and 24, for rotating a roll supporting shaft or arbor 25 extending for the full length of the machine bed between the ends thereof, and for rotating a roll driving head or chuck 26 disposed at the right end of the machine.

The spindle 25 is supported at its ends by bearing brackets or stanchions 26b and 27, the latter bracket employing a novel, quick release mechanism in accordance with the invention, as will be hereinafter more fully disclosed and described.

Carried by the machine bed members 22 is a compound knife carriage 30 having a lower portion 31 which is directly supported by the bed members 22, and having an upper, pivoted, forwardly-and-rearwardly movable portion 32 supported by the lower portion 31 and directly, rotatably carrying a cutting tool in the form of a rotary or circular knife 33. As seen in FIG. 5, the upper carriage portion 32 may be mounted by means of a shaft or spindle 35 on the lower portion 31, and a handle 36 may be adjustably mounted on the upper carriage portion 32 to enable the same to be manually operated, when this is desired.

On the handle 36 a scale bracket 37 and scale 38 are carried, said scale being cooperable with or referrable to the cloth roll on the spindle 25, thereby to enable the spacing of the various cuts as effected by the knife 33 to be readily determined and/or checked.

Figure 2:
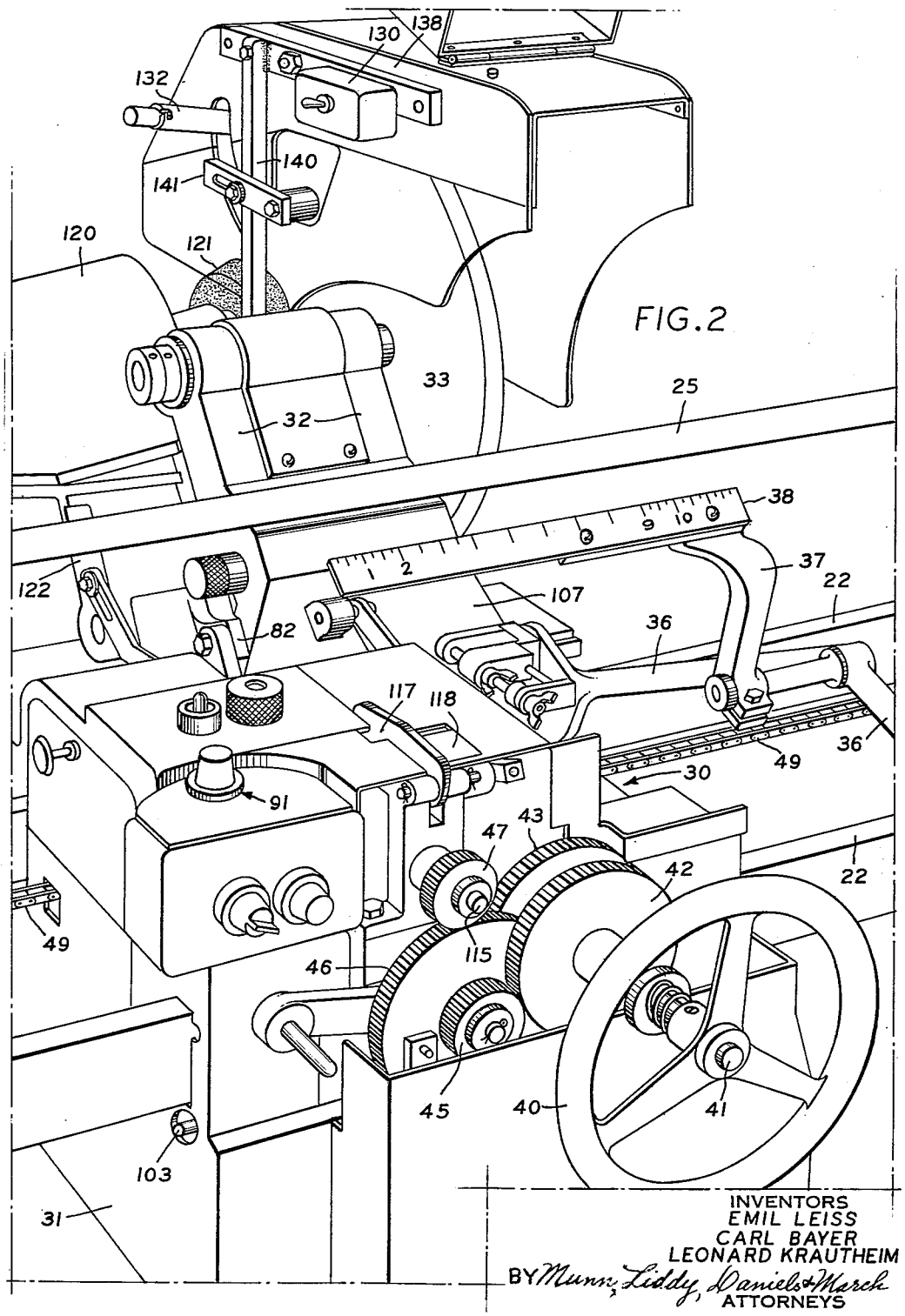
FIG. 2 is a fragmentary front perspective view of the major portion of the compound knife carriage of the machine.
Figure 10:
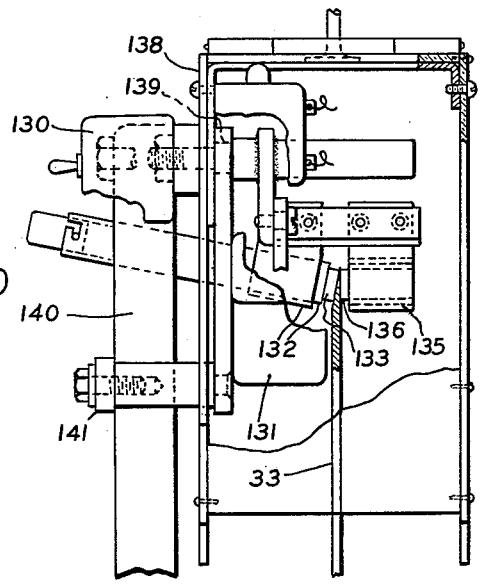
FIG. 10 is a fragmentary front elevational view of the parts shown in FIG. 9.

To provide for manual operation or travel of the compound carriage 30 the usual manual drive mechanism is provided, including a hand wheel 40 projecting from the front of the carriage, see FIGS. 1–3 and 5, mounted on a shaft 41 carrying gears 42 and 43, the latter gear providing for powered shifting of the carriage as will be later described and the gear 42 effecting operation of gears 45, 46 and 47 involved in the automatic spacing or shifting of the carriage by means described later. Only partly shown is a conventional sprocket and stationary chain drive mechanism for effecting travel or shifting of the carriage 30, including sprockets which are caused to turn with turning of the wheel 40 and shaft 41. A portion of one chain 49 is seen in FIGS. 1, 2 and 4, and another chain 50 is shown in section in FIG. 4. Since this type of drive is well-known and conventional, no further details are given here, it being understood that turning of the wheel 40 and shaft 41 to the right will shift the carriage 30 to the right, and vice versa.

It will accordingly be seen from the foregoing that manual operation or travel of the carriage 30 is possible by the hand wheel 40, and that manual advance and retraction of the knife 33 is possible by means of the handle 36.

By the present invention improved means are provided for positively driving the cloth roll 52 carried by the spindle 25, as seen in FIG. 6, and also improved means are provided for quickly applying the cloth roll and removing the slit spools.

Referring to FIGS. 1, 3 and 6, the driving head or chuck 26 has a plurality of radial T-slots 54 in which riders 55 are slidably mounted, said riders having prongs or spikes 56 adapted to penetrate the end portion of the cloth roll 52 (clearly seen in FIG. 3). The riders 55 may be locked in driving or engaged position by thumb screws 57, thereby to insure a positive drive of the cloth roll.

We further provide axially extending pins 26a on the chuck 26, which are adapted to engage the core tube of the cloth roll, see FIG. 3, said pins being supplemented by the prongs 56 to cause a positive and reliable drive of the roll.

As seen in FIGS. 1, 3 and 4, the stanchion 27 may have a base portion 59 slidable along the bed rails 22, and may have an upper portion 60 pivoted on the lower portion 59 and provided with a lug 61 engaging a limit stop 62, thereby to prevent clockwise movement of the portion 60 beyond the vertical. A yoke 63 constitutes the upper extremity of the portion 60 and cradles the spindle 25, said yoke having apertured ears accommodating a handle 64 by which the spindle 25 is held captive. The handle 64 may be held in place by a wedge-shaped end forced into a tapered hole in one of the yoke portions, and upon its removal the upper stanchion portion 60 is free to swing counterclockwise or to the left as seen in FIG. 3, thereby to clear the spindle 25 for removal or replacement of the cloth rolls and cut spools.

The rotary knife 33, FIG. 6, is driven by means of a pulley 66 on its shaft, accommodating a V-belt 67 passing over a pulley 68 on the shaft 35. A pulley 69 on the same shaft, rigid with the pulley 68, accommodates a V-belt 70 driven from a pulley 71 of a motor 72 which is mounted on the compound carriage 30, see FIG. 7. Thus the knife 33 may be readily power driven and at the same time advanced or retracted, by means of the carriage portion 32 and handle 36.

Figure 12:
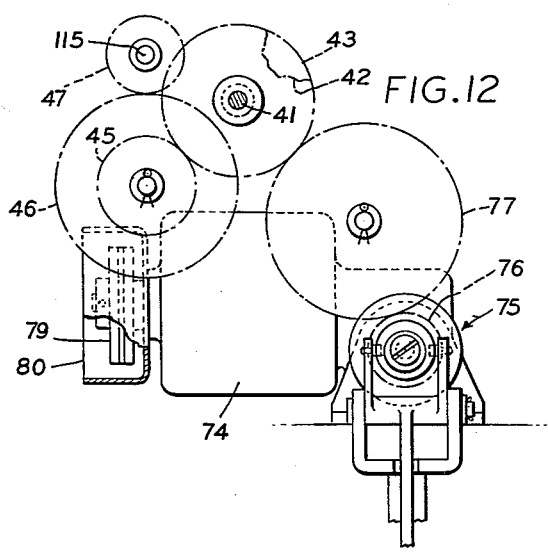
FIG. 12 is a detail showing the carriage shifting or spacer drive mechanism of the machine, as seen from the front.
Figure 13:
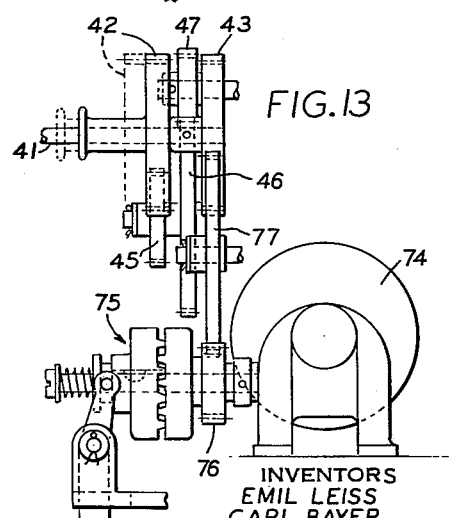
FIG. 13 is an elevational view of the mechanism of FIG. 12, as seen from the left end of the machine.

By the present invention we provide a novel, automatic means for effecting a correlated travel of the compound carriage 30 and of the upper carriage portion 32, thereby to effect an automatic slitting of the roll of cloth 52 as it is being turned on the spindle 25. Shifting or travel of the carriage 30 along the rails 22 is effected by a power drive comprising, FIGS. 12 and 13, a drive motor 74 mounted on the carriage and having a clutch assembly 75 and drive pinion 76 controlled by the clutch. The drive pinion 76 engages and drives a gear 77 which in turn engages and drives the gear 43 on the carriage shifting shaft 41. The motor 74 also has associated with it an electrical brake 79 disposed in a suitable enclosure 80, such brake halting the motor armature and in conjunction with the clutch 75 providing an effective control over the movements of the carriage 30 along the bed rails 22 as effected by the motor. Thus, powered means are provided to shift the carriage 30 along the rails 22, and in accordance with the invention the motor 74 is of the reversible type whereby the carriage 30 may be shifted either to the right or to the left as desired.

In the present machine the carriage is started in its automatic operation at the left, and progressively shifts toward the right until it reaches the right end of the machine bed, at which point it is automatically stopped.

Automatic controlled advance of the upper carriage portion 32 and knife 33 are effected, in accordance with the invention by a combination pneumatic and hydraulic-check type of control, clearly shown in FIGS. 7 and 8. The upper carriage portion 32 has a forwardly-extending driving arm 82 pivotally connected with a plunger rod 83 of an air cylinder 84 mounted by means of pivots 85 on the lower carriage portion 31. Connected with the plunger 83 is a second plunger 86 of a cylinder 87 of the hydraulic type. Such cylinder 87 is mounted, for example, by means of a connecting bracket 88. An electrically-operated air valve 90 is provided, to control the reversible movements of the plunger 83 of the air cylinder 84. The air valve comprises an electrically controlled solenoid unit which is provided with two air ports and a slide valve. The solenoids operate the slide valve to open one of the ports while closing the other. Thus air flow is routed either to the base of the air cylinder 84 to raise the plunger 83 or alternatively to the top of the air cylinder to push the plunger down. It will now be understood that, by the above organization, the upper carriage portion 32 may be advanced forwardly or retracted by proper electrical control of the air valve 90, and that the movements of the carriage portion 32 will be damped and made uniform by the hydraulic cylinder 87 whose action may be controlled by an adjustable valve assembly 91 to vary the speed of movement of the carriage portion 32.

By the present invention we provide a novel and improved, simple and effective yet inexpensive control system, in conjunction with the pneumatic-hydraulic power and control means feeding the knife and retracting the same and in conjunction with the electrical drive means for shifting the carriage, whereby automatic actuation of the carriage portions 31 and 32 is effected to cause progressive slitting of the cloth roll on the spindle 25 as the said roll is being turned, for the purpose of parting the roll into a plurality of separate spools. This control mechanism is depicted in the block diagram of FIG. 14, and various components thereof are of course also to be seen in the other views of the drawings. The control system includes a relay bank 95 for effecting energization of the knife-driving motor 72 and roll-driving motor 96 in single directions, and for effecting energization in either of reverse directions of the carriage advancing and return motor 74 (also termed herein the "spacer" motor). Such energization is indicated schematically merely by single lines connecting these components, and other energizing functions are similarly indicated in the block diagram of FIG. 14. It should be understood, however, that the single line showings are representative of multi-wire connections, to effect the desired results. A starting switch 97 may be connected with the relay bank 95, to initiate actuation of certain of the relays therein, as will be later brought out.

The block diagram also shows low voltage relays 98 and 99, high voltage relays 100 and 101, a manually operable reversing switch 102 connected with the relay 100 and functioning to effect reverse or right-to-left travel of the carriage 30 along the rails 22, as later more fully explained. At this point it may be noted that the relays 101 and 100 both exercise a control over the clutch 75 and brake 80, the relay 101 being actuated to engage the clutch and release the brake for forward energization of the carriage drive or spacer motor 74 and the relay 100 being energized for reverse energization of the motor 74. Limit switches 103 and 104 are carried at the left and right sides respectively of the carriage portion 31, and engageable with adjustable abutment operators 105 and 106 carried by the machine frame (see FIGS. 1 and 14) whereby automatic switching occurs as the carriage 30 reaches a left or right extremity of its movement. Front and rear limit switches 108 and 109 respectively are provided, actuated in response to forward and reverse movement of the upper carriage portion 32 as said portion reaches the extremities of said movements (see FIGS. 5 and 8). The forward limit switch 108 is connected with a low voltage relay 111 which is in turn connected with a time delay relay 112 connected to the electro-air valve 90.

Figure 14:
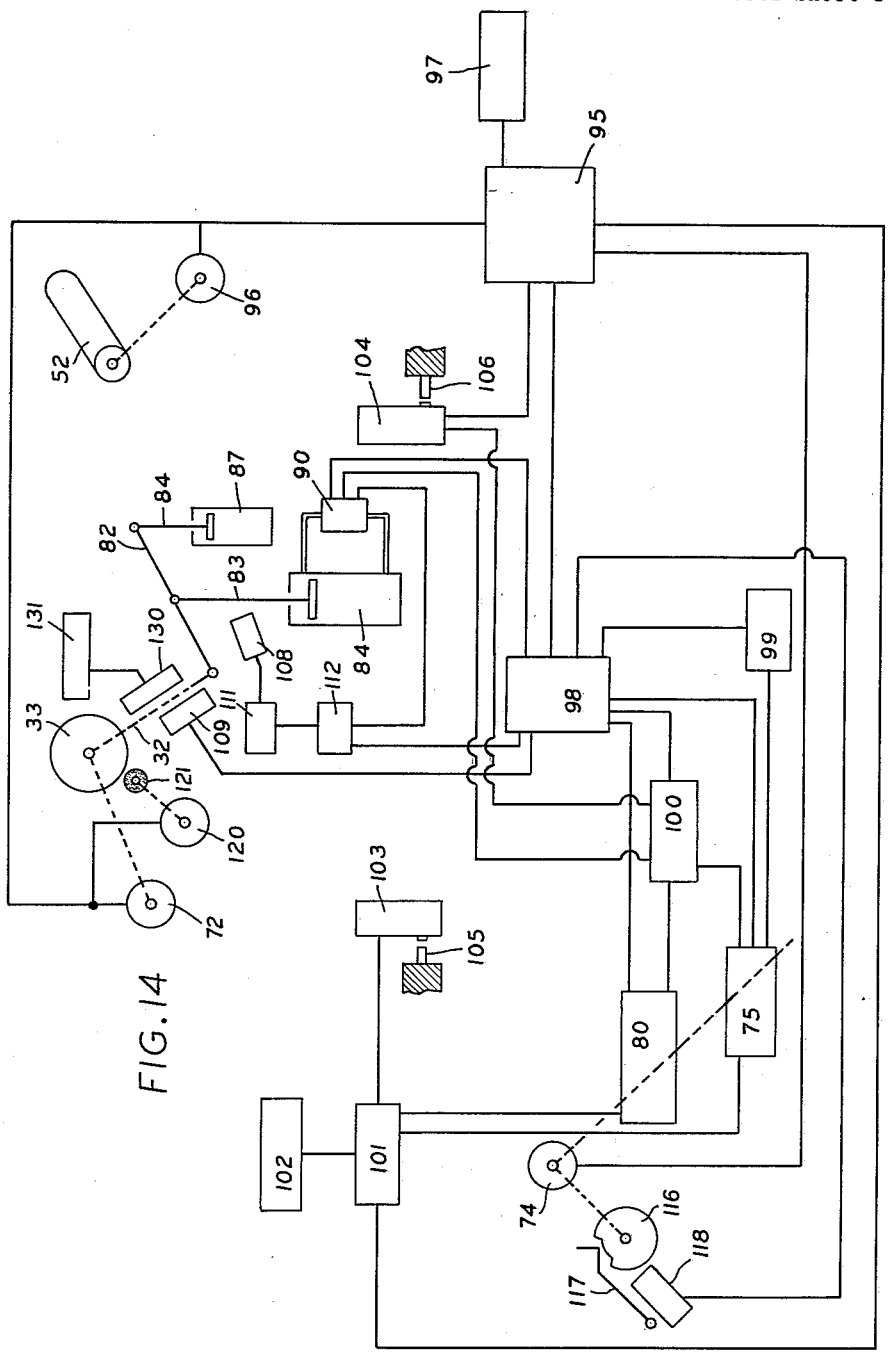
FIG. 14 is a block diagram, to illustrate the sequence of operation of the various components of the machine.

Rigid with the gear 47 and carried by a shaft 115 thereof (see FIG. 2) is a cam wheel 116, FIG. 14, such cam wheel being thereby driven from the carriage advance motor 74 as indicated. Cooperable with the cam wheel 116 is an arm 117, FIGS. 2 and 14, arranged to actuate a microswitch 118 which is connected with the low voltage relay 98.

Various other components shown in the block diagram of FIG. 14, which have been previously mentioned or described in connection with the construction of the machine have been given the same reference characters.

The automatic and semi-automatic operation of the present improved slitting machine will now be explained with reference especially to FIG. 14. The operator first actuates the starting switch 97. This energizes relays in the bank 95, and causes the motors 72 and 96 to be energized and started. The roll of fabric 52 is thus caused to rotate, and the knife 33 is driven. The carriage 30 is now manually shifted along the rails 22 by means of the hand wheel 40 to position the knife 33 for making an initial, manually effected cut at the beginning or left end of the fabric roll 52. The cutter handle 36 is then actuated after positioning of the carriage 30, to bring the rotating knife forward so as to effect such cut. The knife 33 is then returned to its rearward, retracted position. The automatic operation of the apparatus is now initiated, and this may be done by manual actuation of the cam-operated switch 118 or by an equivalent of such switch, so as to energize the low voltage relay 98. Such energization will now result in this relay operating the air valve 90 to cause powered advance of the knife 33 by virtue of downward movement of the plunger 83. The rotating knife 33 is now being caused to cut through the rotating fabric roll, in accordance with the method of the invention, the speed of cutting being variably controlled and determined by the hydraulic-check cylinder 87 and the adjustable valve means 91 of said cylinder, with a dwell incorporated at the end of the stroke, as follows: As the upper carriage portion 32 advances to the termination of its forward movement as determined by an abutment 107 which strikes and thereby actuates the front microswitch 108, energizing the low-voltage relay 111 which in turn energizes the time-delay relay 112. For an interval determined by the time delay relay 112 the valve 90 now remains closed so that the knife 33 is made to dwell at the forward extremity of its stroke, thereby to thoroughly cut through the harder core material within and supporting the fabric roll. When sufficient time has elapsed to effect this, the time delay relay 112 expires and in so doing it releases the low voltage relay 98 and actuates and reverses the electro-air valve 90. The carriage portion 32 and knife 33 are now driven backward, and at the end of the backward stroke the rear microswitch 109 is actuated.

The rear microswitch 109 now energizes the low-voltage relay 98, which in turn effects a release of the electrical brake 80 and causes engagement of the clutch 75, both associated with the carriage spacer motor 74. The relay bank 95 is also energized by this actuation of the low-voltage relay 98 whereby this bank starts the motor 74 in a forward direction. In consequence, the carriage 30 is caused to travel from left to right along the rails 22. After a predetermined distance of travel equal to the width of spool which is to be cut away from the fabric roll 52, the cam wheel 116 in turning will actuate the lever 117 which causes operation of the microswitch 118. This in turn actuates the low-voltage relay 98, effecting operation of the relay bank to halt the motor 74, and effecting operation of the high-voltage relays 99 and 101 to release the clutch 75 and apply the electrical brake 80. Also, the operation of the low-voltage relay 98 actuates the air valve 90 to cause the carriage portion 92 and knife 33 to travel forward in another working stroke. The high-voltage relay 99 temporarily holds the low-voltage relay 98 energized while the knife 33 and the carriage portion 32 start forward and disengage the rear microswitch 109. This holding of the relay 98 also keeps the clutch 75 disengaged while the knife starts forward, and such holding of the relay 98 prevents chatter as the rear microswitch 109 is deenergized. It also prevents clutch chatter or fluttering, and prevents bouncing or fluttering of the switch operator 117 associated with the cam wheel 116. As above mentioned, the high voltage relay 101 when actuated by the relay 98 effects disengagement of the clutch 75 and engagement of the brake 80. With the air valve 90 actuated by the held low voltage relay 98, the knife 33 and carriage 32 are started forward. The relays 98 and 99 are now released, whereupon the forward working stroke of the knife 33 is carried through, performing a slitting of the fabric roll 52 as above explained in connection with the initial automatic cut. This cycle is now repeated, while the carriage 30 is periodically advanced from left to right. After the final automatic cut is effected in the fabric roll 52 and the knife 33 is finally retracted, the carriage 30 advances a last time until the abutment 106 actuates the limit switch 104. This operates the high voltage relay 101, disengaging the clutch 75 and energizing the brake 80. Also, there is effected by the limit switch 104 actuation of the relay bank 95, halting the carriage advance motor 74. The machine is now brought to a halt in its automatic operation.

To return the carriage the reversing switch 102 is actuated, operating the relay 100 which now energizes the relay bank 95 to cause energization of the motor 74 for reverse turning. The carriage 30 now travels from right to left with the knife 33 and upper carriage portion 32 remaining retracted, and when the left extremity of movement of the carriage is attained, the abutment 105 actuates the limit switch 103. This releases the relay 100, deenergizing the relay bank 95 to de-energize the carriage motor 74. The relay 100 also applies the brake 80. The carriage 30 now remains at a standstill at the left of the bed, in readiness for the next operation.

By the present invention the slitting machine as above described may be at any time operated manually to the exclusion of the automatic, power operation. This is easily accomplished, in the following manner: The air valve 90 when not electrically energized assumes a neutral, bleeding position whereby the pneumatic piston and cylinder may be freely actuated. Also, the hydraulic-check device is made freely movable by setting the control valve means therefor to a bleeding position. Thus, by use of the handle 36 the upper carriage portion 32 may be advanced or retracted by the operator. Also, when the electric clutch 75 is de-energized, it remains in released position, disengaging the motor 74 from the carriage drive mechanism. Therefore, the carriage 30 may be shifted or spaced manually, by merely turning the hand wheel provided at the front thereof.

There is additionally provided, in accordance with the present invention, a novel means for conditioning the knife 33 to enable the successive cuts in the roll of fabric 52 to be quickly and effectively carried out at all times. Such means comprises an automatic sharpening device and an automatic waxing device whereby the blade is sharpened after each cut and waxed prior to making the next or succeeding cut.

Referring to FIGS. 1, 2, 5, 6 and 14, we provide a grinder motor 120 having a grinding wheel 121, said motor being carried by a bracket 122 on the lower portion 31 of the carriage. Connected with the bracket 122 and rigid therewith is a second bracket 123 clearly shown in FIGS. 1 and 5. The bracket 123 mounts an emery element 124 adapted to engage the right side of the knife 33 at the same time that the grinding wheel 121 is engaging the left side as viewed from the front of the machine. Such engagement occurs only when the knife 33 is in its rearmost position. The grinder motor 120 is arranged to run continuously with the knife motor 72, as will be evident from an inspection of FIG. 14. To accommodate wear of the knife 33, as it becomes smaller in diameter, the motor 120 and wheel 121, as well as the emery element 124, may be shifted in a direction toward the axis of the knife. Thus, as the upper carriage portion 32 and knife 33 are brought back each time from succeeding cuts, the knife may be engaged by the grinding wheel 121 and stone 124, to cause sharpening of both sides of the knife, by proper periodic adjustment of the sharpening elements above set forth.

Figure 11:
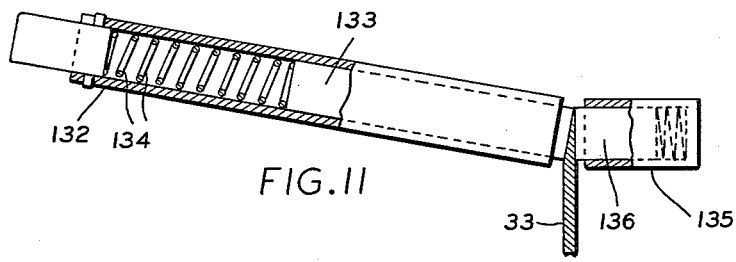
FIG. 11 is a fragmentary detail in elevation, showing a knife waxing mechanism of the apparatus.

Additionally, we provide a waxing means as shown in FIGS. 1, 2, 5, 9–11 and 14, which is operative on the knife 33 only when the same commences its forward stroke. The waxing means includes a waxer switch 130 arranged to be actuated only as the upper carriage portion 32 begins its forward movement, such switch being bypassed by virtue of a trip device during the backward stroke of the upper carriage portion. The waxer switch 130 is connected with a solenoid 131 which actuates a wax holder and bracket 132 containing a stick of wax 133 normally urged to extended position by a spring 134. The wax 133 engages the left side of the knife 33 as viewed from the front, when the solenoid 131 is energized. A holder 135 is also provided, for a piece of wax 136 for engagement with the other or reverse side of the knife, as seen in FIG. 11. The holders 132 and 135 and the solenoid 131 are mounted on a head piece and guard 138 which is pivoted at 139 on an upstanding bracket or upright 140. An adjustable link 141 carried by the head piece and guard 138 and screwed to the upright 140 provides for adjustable angular positioning of the head piece to enable the waxing elements to be adjusted downward toward the axis of the knife shaft, thereby to compensate for wear as the knife becomes smaller. It will be understood that the holders 132 and 135 are normally in raised positions, out of engagement with the knife 33 when the solenoid 131 is deenergized, and such holders are only brought down by the solenoid momentarily during the initial forward movement of the knife 33 and carriage portion 32, to effect the waxing.

Figures 15, 16, 17:
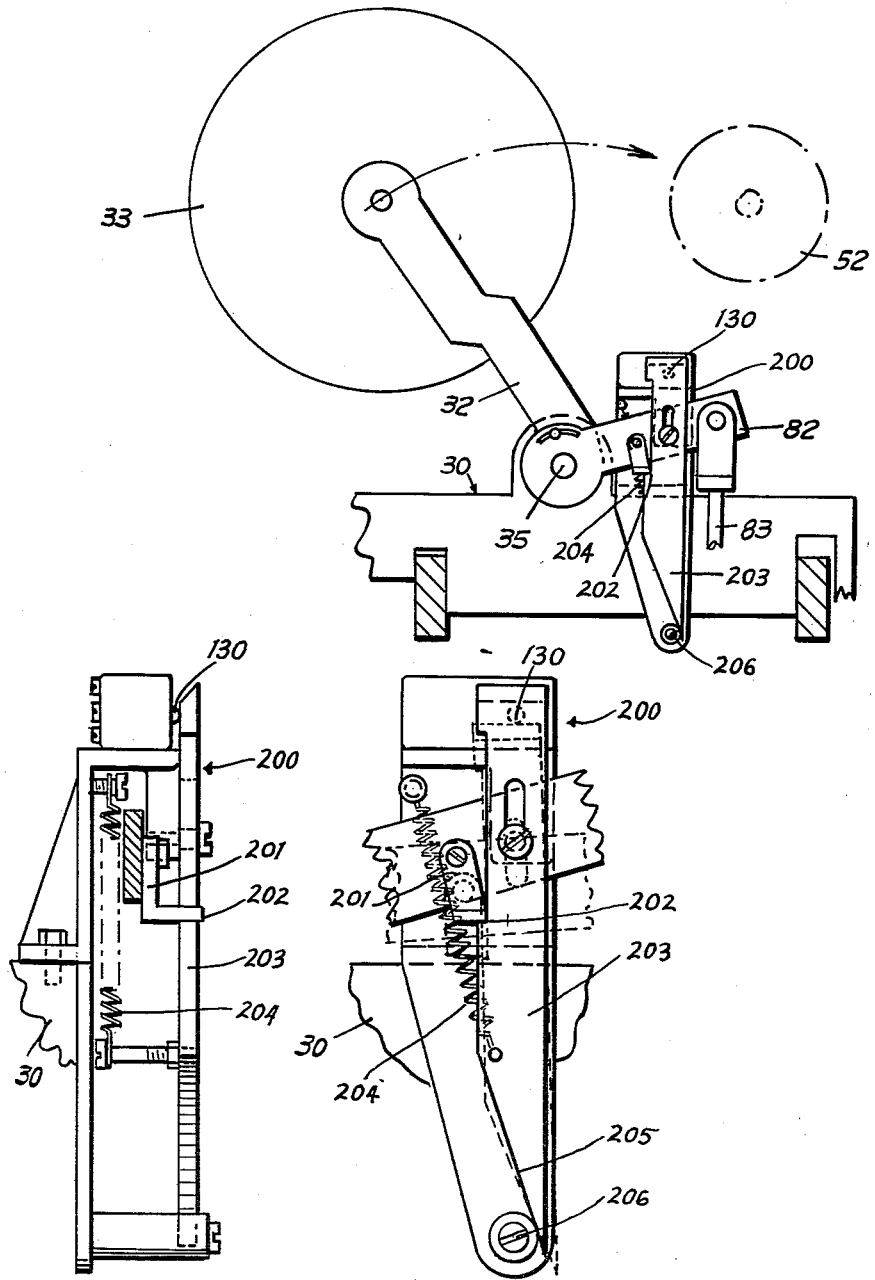
FIG. 15 is a detail showing the trip device for by-passing the waxer operative means during the backward stroke of the knife carriage.
FIG. 16 is a front elevational view partially in section of the trip device.
FIG. 17 is a side elevational view partially in section of the trip device.

The trip device 200 for by-passing the waxer switch 130 comprises an adjustable lever 201 carried by the forwardly extending driving arm 82. The adjustable lever is normally in engagement with a shoulder 202 provided on a cam arm 203. This engagement normally maintains the cam arm in the position shown in FIGS. 15 through 17 in solid lines and maintains the cam arm against the action of spring 204 in position where the upper portion of the cam arm depresses switch 130 to thereby maintain the solenoid for operating the waxer in inoperative position. As soon as the knife carriage 32 begins its forward motion in the direction of the arrow shown in FIG. 15, the adjustable lever is moved downwardly causing the cam arm to also move downwardly. As the cam surface 205 of the cam arm rides over pin 206, the cam arm is displaced to the position shown by the dotted lines in FIG. 17 and disengages the upper portion of the cam arm momentarily from switch 130. The waxer is thereby operated. The movement of the cam arm over the cam surface also causes the cam arm to become disengaged from the trip lever and under the action of spring 204, the cam arm returns moving upwardly to again engage and depress switch 130 whereby the waxer is no longer operative. On the return stroke of the knife carriage, the cam arm 203 continues to engage the switch 130 and upon the full return of the carriage, the component parts reassume the position shown in FIG. 15.

The head piece or guard 138 may be provided with a safety master switch which opens the energizing circuit through the machine whenever the guard is raised, as for the purpose of making adjustments, changing blades, etc.

From the foregoing it will be seen that we have provided a relatively simple and inexpensive, automatic slitting machine which does not require a multiplicity of expensive, precision machine parts as was heretofore necessary in machines embodying in the main mechanical movements. The present improved machine is extremely flexible in its operation, and may be operated automatically or manually as required. When operating automatically it spaces or advances the carriage and feeds the knife at a controlled predetermined rate to effect the slitting of the fabric roll in the cleanest and most effective manner. The knife is made to dwell at the end of its cutting stroke for a sufficient interval of time to completely cut through the core of the fabric roll. But a single motor is employed in effecting both the advance and return movements of the carriage. By the provision of the simplified tail stock support for the shaft 25, in conjunction with the improved drive head 26, the mounting and supporting of the fabric roll and the turning thereof is facilitated and carried out in a reliable manner at all times. The automatic sharpening and waxing of the knife 33 further insures a clean cut each time, and one which completely severs the fabric core of the roll.

Variations and modifications may be made within the scope of the claims, and portions of the improvements may be used without others.

We claim:

1. In a machine, for slitting rolls of fabric into multiple narrow spools, a circular, rotatable knife; a carriage mounting said knife for advancing and retracting movements with respect to a roll of fabric which is to be slitted; a supply of wax for lubricating said knife; means movably mounting said wax supply between a retracted position and an advanced position, said advanced position being in the path of movement of said knife whereby the knife will engage the wax and be coated thereby; and automatic actuator means responsive to movement of said carriage, for shifting said wax supply to its advanced position to cause said engagement as the knife is moved by the carriage.

2. The invention as described in claim 1 in which the actuator means includes a solenoid and a switch controlling the solenoid circuit, and includes a switch operator means providing a one-way driving connection with the said carriage whereby the switch is actuated only by advancing movement of the carriage.

3. The invention as described in claim 1 in which the supply of wax comprises two sticks thereof, and in which the movable mounting means is adapted to support the said sticks for engagement with opposite sides of the said knife.

4. In a machine for slitting rolls of fabric into multiple narrow spools, a compound carriage having connected portions movable with respect to each other, one of said portions being adapted to mount a cutting tool; a machine bed on and along which the said other carriage portion is movable; drive means on said bed and carriage for effecting travel of said carriage along the bed; an electric motor and electric clutch on the carriage, connected with said drive means to power the latter; pneumatic power means carried by the carriage to effect relative reverse movements of the said portions thereof with respect to each other; electrically operated valve means connected to the power means for controlling the same; spacer switch means connected with the motor and clutch for effecting energization of the motor and gripping of the clutch; cut-initiating switch means connected to the electrically-operated valve means for effecting energization of said valve means, to cause advancing movement of said one carriage portion from an initial retracted position, for effecting a tool cut; forward switch means connected to the cut-initiating switch means and electrically operated valve means and operable by said one carriage portion upon the latter reaching a predetermined advanced position, rendering inoperative said cut-initiating switch means and effecting energization of said valve means to cause retraction of the one carriage portion; means on the carriage, responsive to said one carriage portion reaching a predetermined retracted position, actuating said spacer switch means to cause traversing movement of the carriage; limit means responsive to a predetermined travel of the carriage along the bed, rendering inoperative said spacer switch means, including means for actuating said cut-initiating switch means to cause another advance of said one carriage portion to effect another cut.

5. The invention as described in claim 4 in which the limit means comprises an electric switch on the carriage and a switch actuating member therefor, and comprises a wheel engageable with said member to operate the same, said carriage drive mechanism being connected to said wheel to drive the same.

6. The invention as described in claim 5 in which the carriage drive mechanism includes a positive chain drive having a chain fixed to the machine bed.

7. The invention as described in claim 4 in which there is an electric brake connected to the armature of the motor, and brake actuating means rendered inoperative during the times that the clutch is gripping.

8. The invention as described in claim 4 in which there is means actuated after the one carriage portion has left its retracted position, rendering said limit means ineffective to render inoperative the said spacer means.

9. The invention as described in claim 4 in which there is a holding means associated with and controlling said cut-initiating switch means, to hold the latter closed after its initial closing, said forward switch means acting on said holding means to render inoperative the cut-initiating switch.

10. In a machine for slitting rolls of fabric into multiple narrow spools, a compound carriage having connected portions movable with respect to each other, one of said portions being adapted to mount a cutting tool; a machine bed on and along which the said other carriage portion is movable; drive means on said bed and carriage for effecting travel of said carriage along the bed; an electric motor and electric clutch on the carriage, connected with said drive means to power the latter; pneumatic power means carried by the carriage to effect relative reverse movements of the said portions thereof with respect to each other; electrically operated valve means connectd to the power means for controlling the same; spacer switch means connected with the motor and clutch for effecting energization of the motor and gripping of the clutch; cut-initiating switch means connected to the electrically-operated valve means for effecting energization of said valve means, to cause advancing movement of said one carriage portion from an initial retracted position, for effecting a tool cut; forward switch means connected to the cut-initiating switch means and electrically operated valve means and operable by said one carriage portion upon the latter reaching a predetermined advanced position, rendering inoperative said cut-initiating switch means and effecting energization of said valve means to cause retraction of the one carriage portion; means on the carriage, responsive to said one carriage portion reaching a predetermined retracted position, actuating said spacer switch means to cause traversing movement of the carriage; limit means responsive to a predetermined travel of the carriage along the bed, rendering inoperative said spacer switch means, including means for actuating said cut-initiating switch means to cause another advance of said one carriage portion to effect another cut; switch means on the carriage, operable when the carriage reaches a predetermined final point in its travel on the bed under the action of said motor and clutch, rendering inoperative said spacer switch means, thereby to effect release of said clutch and de-energization of said motor so as to halt the carriage.

11. The invention as described in claim 4 in which the valve means has a bleed position permitting free movement of said pneumatic power means and one carriage portion, in which the electric clutch when de-energized is disengaged, and in which there are manually engageable means respectively on said one carriage portion and on said carriage, for actuating the same to advance and retract the carriage portion and travel the carriage whereby the machine may be manually operated independently of said motor and pneumatic power means.

12. In a machine for slitting rolls of fabric into multiple narrow spools, a compound carriage having connected portions movable with respect to each other, one of said portions being adapted to mount a cutting tool; a machine bed on and along which the said other carriage portion is movable; drive means on said bed and carriage for effecting travel of said carriage along the bed; an electric motor and electric clutch on the carriage, connected with said drive means to power the latter; pneumatic power means carried by the carriage to effect relative reverse movements of the said portions thereof with respect to each other; electrically operated valve means connected to the power means for controlling the same; spacer switch means connected with the motor and clutch for effecting energization of the motor and gripping of the clutch; cut-initiating switch means connected to the electrically-operated valve means for effecting energization of said valve means, to cause advancing movement of said one carriage portion from an initial retracted position, for effecting a tool cut; forward switch means connected to the cut-initiating switch means and electrically operated valve means and operable by said one carriage portion upon the latter reaching a predetermined advanced position, rendering inoperative said cut-initiating switch means and effecting energization of said valve means to cause retraction of the one carriage portion; means on the carriage, responsive to said one carriage portion reaching a predetermined retracted position, actuating said spacer switch means to cause traversing movement of the carriage; limit means responsive to a predetermined travel of the carriage along the bed, rendering inoperative said spacer switch means, including means for actuating said cut-initiating switch means to cause another advance of said one carriage portion to effect another cut; switch means on the carriage, operable when the carriage reaches a predetermined final point in its travel on the bed under the action of said motor and clutch, rendering inoperative said spacer switch means, thereby to effect release of said clutch and de-energization of said motor so as to halt the carriage; and manually operable switch means for effecting reverse energization of said motor and gripping of the clutch, thereby to return the carriage toward its initial starting position.

13. In a machine for slitting rolls of fabric into multiple narrow spools, a compound carriage having connected portions movable with respect to each other, one of said portions being adapted to mount a cutting tool; a machine bed on and along which the said other carriage portion is movable; drive means on said bed and carriage, for effecting travel of said carriage along the bed; an electric motor and electric clutch on the carriage, connected with said drive means to power the latter; pneumatic power means carried by the carriage to effect relative reverse movements of the said portions thereof with respect to each other; electrically operated valve means connected to the power means for controlling the same; spacer switch means connected with the motor and clutch for effecting energization of the motor and gripping of the clutch; cut-initiating switch means connected to the electrically-operated valve means for effecting energization of said valve means, to cause advancing movement of said one carriage portion from an initial retracted position, for effecting a tool cut; forward switch means connected to the cut-initiating switch means and electrically operated valve means and operable by said one carriage portion upon the latter reaching a predetermined advanced position, rendering inoperative said cut-initiating switch means and effecting energization of said valve means to cause retraction of the one carriage portion; means on the carriage, responsive to said one carriage portion reaching a predetermined retracted position, actuating said spacer switch means to cause traversing movement of the carriage; limit means responsive to a predetermined travel of the carriage along the bed, rendering inoperative said spacer switch means, including means for actuating said cut-initiating switch means to cause another advance of said one carriage portion to effect another cut; switch means on the carriage, operable when the carriage reaches a predetermined final point in its travel on the bed under the action of said motor and clutch, rendering inoperative said spacer switch means, thereby to effect release of said clutch and de-energization of said motor so as to halt the carriage; manually operable switch means for effecting reverse energization of said motor and gripping of the clutch, thereby to return the carriage toward its initial starting position; and switch means operated when the carriage reaches an initial starting position, de-energizing said motor and releasing the said clutch.

References Cited in the file of this patent

UNITED STATES PATENTS

| | | |
|---|---|---|
| 878,705 | Adams | Feb. 11, 1908 |
| 897,676 | Thompson | Sept. 1, 1908 |
| 1,184,614 | Brightman | May 23, 1916 |
| 1,477,186 | Randolph | Dec. 11, 1923 |
| 1,892,058 | Judelshon | Dec. 27, 1932 |
| 2,122,204 | Gora | June 28, 1938 |
| 2,186,583 | Groh | Jan. 9, 1940 |
| 2,299,852 | Shaner | Oct. 27, 1942 |
| 2,326,498 | Rodal | Aug. 10, 1943 |
| 2,457,310 | Judelshon | Dec. 28, 1948 |
| 2,476,530 | Belada | July 19, 1949 |

(Other references on following page)

UNITED STATES PATENTS

| | | |
|---|---|---|
| 2,496,995 | Gorton | Feb. 7, 1950 |
| 2,672,780 | Schurr | Mar. 23, 1954 |
| 2,691,962 | Johnson | Oct. 19, 1954 |
| 2,726,688 | Flood | Dec. 13, 1955 |
| 2,778,261 | Garbe | Jan. 22, 1957 |
| 2,782,565 | Jones et al. | Feb. 26, 1957 |
| 2,785,457 | Pigott | Mar. 19, 1957 |
| 2,807,180 | Adams | Sept. 24, 1957 |
| 2,807,973 | Meyer et al. | Oct. 1, 1957 |